(12) United States Patent
Allezard et al.

(10) Patent No.: US 9,361,696 B2
(45) Date of Patent: Jun. 7, 2016

(54) METHOD OF DETERMINING A GROUND PLANE ON THE BASIS OF A DEPTH IMAGE

(71) Applicant: COMMISSARIAT A L'ENERGIE ATOMIQUE ET AUX ENERGIES ALTERNATIVES, Paris (FR)

(72) Inventors: Nicolas Allezard, Paris (FR); Alexandre Hervieu, Paris (FR); Laurent Lucat, Le Mans (FR)

(73) Assignee: Commissariat A L'Energie Atomique Et Aux Energies Alternatives, Paris (FR)

( * ) Notice: Subject to any disclaimer, the term of this patent is extended or adjusted under 35 U.S.C. 154(b) by 0 days.

(21) Appl. No.: 14/385,105

(22) PCT Filed: Mar. 15, 2013

(86) PCT No.: PCT/EP2013/055320
§ 371 (c)(1),
(2) Date: Sep. 12, 2014

(87) PCT Pub. No.: WO2013/139684
PCT Pub. Date: Sep. 26, 2013

(65) Prior Publication Data
US 2015/0036887 A1    Feb. 5, 2015

(30) Foreign Application Priority Data
Mar. 23, 2012 (FR) ..................... 12 52645

(51) Int. Cl.
G06K 9/00 (2006.01)
G06T 15/00 (2011.01)
G01C 3/14 (2006.01)
G06T 7/00 (2006.01)

(52) U.S. Cl.
CPC .......... *G06T 7/0051* (2013.01); *G06K 9/00201* (2013.01); *G06T 7/0046* (2013.01); *G06T 2207/10021* (2013.01); *G06T 2207/10028* (2013.01); *G06T 2207/30252* (2013.01)

(58) Field of Classification Search
None
See application file for complete search history.

(56) References Cited

U.S. PATENT DOCUMENTS

| 7,741,961 B1 | 6/2010 | Rafii et al. | |
| 2002/0110273 A1* | 8/2002 | Dufour | G06T 17/005 382/154 |

(Continued)

OTHER PUBLICATIONS

Wedel et al., "B-spline Modeling of Road surfaces with an Application for Free Space Estimation", IEEE Transaction on Intelligent Transportation System, vol. 10, No. 4 pp. 572-583, Dec. 1, 2009.*

(Continued)

*Primary Examiner* — Randolph I Chu
(74) *Attorney, Agent, or Firm* — Baker & Hostetler LLP

(57) ABSTRACT

A method of determining a triplet of parameters defining a ground plane based on a depth image includes determining a plurality of triplets of parameters, each defining a ground plane, spatial filtering of the parameters, and temporal filtering of the parameters. The temporal filtering is dependent on an indicator of quality of depth image data available for determination of the ground plane. The temporal filtering is dependent on an indicator of quality of the ground plane determined after spatial filtering. Similarly, the spatial filtering can be parameterized as a function of the two indicators. Globally, the more the estimated plane for a depth image can "explain" the points in this image, the more accurately planes of the subsequent images are determined. For the spatial filtering, the ground plane is searched in a more limited space, and, for the temporal filtering, the previously estimated ground planes considered to a lesser degree.

18 Claims, 2 Drawing Sheets

(56) References Cited

U.S. PATENT DOCUMENTS

| | | | | |
|---|---|---|---|---|
| 2002/0134151 | A1* | 9/2002 | Naruoka | G01S 11/12 73/291 |
| 2009/0243889 | A1* | 10/2009 | Suhr | G06K 9/00812 340/932.2 |
| 2010/0020074 | A1* | 1/2010 | Taborowski | G06T 7/0065 345/420 |
| 2010/0299109 | A1* | 11/2010 | Saito | B60W 40/072 703/1 |
| 2010/0322476 | A1* | 12/2010 | Kanhere | G06T 7/0065 382/103 |
| 2012/0033077 | A1* | 2/2012 | Kitaura | G06T 15/205 348/148 |
| 2012/0056873 | A1* | 3/2012 | Kim | H04N 13/026 345/419 |
| 2012/0242835 | A1* | 9/2012 | Li | G08G 1/167 348/148 |
| 2013/0113881 | A1* | 5/2013 | Barnum | H04N 13/0018 348/43 |
| 2013/0163879 | A1* | 6/2013 | Katz | G06T 7/0044 382/195 |

OTHER PUBLICATIONS

Jun et al. "Detection of Non-flat ground surfaces using V-disparity images", Intelligent Robots and System, pp. 4584-4589, Oct. 10, 2009.*

Luong et al. "An intergrated Stereo based approach to automatic vehicle guidance", Computer Vision, pp. 52-57, Jun. 20, 1995.*

N. Molton, et al., "A Stereo Vision-Based Aid for the Visually Impaired", Image and Vision Computing, Apr. 3, 1998, pp. 251-253, vol. 16, No. 4, Elsevier, Netherlands, XP002689530.

Angel D. Sappa, et al., "Real Time Vehicle Pose Using On-Board Stereo Vision System", Image Analysis and Recognition Lecture Notes in Computer Science, Jan. 1, 2006, pp. 205-216, Springer, Berlin, DE, XP019043780.

Stephen Se, et al., "Stereo Vision-Based Obstacle Detection for Partially Sighted People", Third Asian Conference on Computer Vision, 1997, p. 152, vol. 1, Springer-Verlag, Berlin, DE, XP002689531.

Florin Oniga, et al., "Processing Dense Stereo Data Using Elevation Maps: Road Surface, Traffic Isle and Obstacle Detection", IEEE Transactions on Vehicular Technology Mar. 1, 2010, pp. 1172-1182, vol. 59, No. 3, IEEE Service Center, Piscataway, NJ, USA, XP011299067.

Raphael Labayrade, et al., "Real Time Obstacle Detection in Stereovision on Non Flat Road Geometry Through "V-Disparity" Representation", IEEE Intelligent Vehicles Symposium, 2002, pp. 646-650, Versailles, FR.

N. Suganuma, et al., "Obstacle Detection Using Virtual Disparity Image for Non-Flat Road", IEEE Intelligent Vehicles Symposium, Jun. 4-6, 2008, pp. 596-601, Eindhoven University of Technology, Eindhoven, NL.

* cited by examiner

METHOD OF DETERMINING A GROUND PLANE ON THE BASIS OF A DEPTH IMAGE

CROSS-REFERENCE TO RELATED APPLICATIONS

This application is a National Stage of International patent application PCT/EP2013/055320, filed on Mar. 15, 2013, which claims priority to foreign French patent application No. FR 1252645, filed on Mar. 23, 2012, the disclosures of which are incorporated by reference in their entirety.

FIELD OF THE INVENTION

The invention lies within the field of image processing applied to the detection of targets and, more precisely, within the field of the estimation of the ground plane in images. It relates to a method of estimating a set of parameters defining a ground plane on the basis of a depth image.

BACKGROUNG

With the increase in road traffic and the growing demand for enhanced safety of property and persons, scientific research has been increasingly focused for at least a decade on driver assistance systems, particularly systems for detecting objects in images, including objects of interest, such as traffic signs, and obstacles, such as pedestrians. Object detection in images is greatly facilitated by a knowledge of the three-dimensional environment of the objects. The main contextual item of information useful for object detection is the location of the ground plane in images. A knowledge of this information makes it possible, notably, to focus an object search on areas of the image where the probability of detection is greatest, to determine the sizes of the objects to be searched for (according to an average height of a person, for example), and to determine whether or not a detected object is located on the ground. The ground plane can be determined on the basis of a depth image, which is itself obtained, for example, from a pair of stereoscopic images. Like any plane in three-dimensional space, the ground plane can be defined mathematically by three independent parameters. By way of example, these parameters may be the height h of the cameras relative to the ground, the angle $\theta$ formed between the axis of each camera and the ground plane, and the angle $\phi$ formed between the ground plane and the axis passing through the optical centers of the cameras.

In the context of an obstacle detection system mounted on a motor vehicle, the ground plane may change relative to the axis of the cameras as a function of the relief of the ground (for example the road) on which the vehicle is maneuvering, the loading of the vehicle, and the acceleration to which it is subjected. Furthermore, the position and orientation of the cameras relative to the vehicle may vary as a result of vibration or shocks. Therefore, the ground plane cannot generally be estimated once for all for any given configuration of the cameras. Thus there is a need to determine the ground plane in the images in a dynamic way, that is to say for each pair of stereoscopic images or at least at regular time intervals.

The methods for estimating the ground plane on the basis of a depth image often use a v-disparity calculation. This calculation requires, on the one hand, the construction of a two-dimensional histogram representing the relationship between the depth and the vertical position of the points of the disparity image, and, on the other hand, the determination of the angle $\theta$ and the height h by means of a Hough transform. A v-disparity calculation of this type is described, for example, in R. Labayrade, D. Aubert, J.- P. Tarel: "Real Time Obstacle Detection in Stereovision on Non Flat Road Geometry Through "V-Disparity" Representation", IEEE Intelligent Vehicles Symposium, Versailles, France, pp. 646-650, 2002. The calculation can be generalized to the determination of the two angles $\theta$ and $\phi$, using a three-dimensional histogram and a generalized Hough transform. The parameters $\theta$, $\phi$ and h can also be determined individually in order to minimize the calculation time and memory required. For example, the paper by N. Suguma, M. Shimoyama and N. Fujirawa: "Obstacle Detection Using Virtual Disparity Image for Non-Flat Road", IEEE Intelligent Vehicles Symposium, Eindhoven, The Netherlands, pp. 596-601, 2008, describes a method in which the parameters $\theta$ and h are determined on the basis of a Hough transform in the space d-v, and in which the parameter $\theta$ is determined subsequently by a Hough transform in the space u-v, where d denotes the disparity and (u,v) are the coordinates of the image of one of the two cameras.

As a general rule, methods using a v-disparity calculation enable the ground plane to be estimated with a degree of robustness in respect of the presence of small vertical objects, that is to say objects represented by a relatively small number of pixels in the disparity image. This is the case, notably, in the presence of standing persons. However, if the presence of vertical objects becomes too great, for example if a wall is present in the image, the estimation methods may yield aberrant results, for example the plane of the wall in the image. Moreover, these methods are also highly dependent on the quantity and quality of the pixel depth data. These depth data are generally calculated by an algorithm for matching two simultaneously acquired stereoscopic images. Pixel matching between the two stereoscopic images is possible only if these images have textured areas, that is to say if points in the observed scene can easily be identified in each of the images. However, some scenes generate very few textured areas. Thus the precision of the ground plane estimation may become inadequate or even unattainable for some scenes.

To reduce the effect of these two problems, it is possible to introduce topological and/or temporal constraints into the ground plane estimation methods. The introduction of topological constraints consists in filtering the results, in this case the parameters defining the ground plane, according to whether or not they fall within the ranges of acceptable values. These ranges of values must be determined in accordance with the context of use, notably according to whether or not the ground may be horizontal or inclined, whether or not it may have holes and protrusions, whether the vehicle has soft or hard suspension, whether or not it may be loaded, and so forth. The introduction of temporal constraints consists in making use of the consistency between the estimate of one image and that of a previous image. Typically, it is a matter of allowing a limited extent of variation between two estimates.

By way of example, in the paper cited above, by N. Suguma, M. Shimoyama and N. Fujirawa: "Obstacle Detection Using Virtual Disparity Image for Non-Flat Road", IEEE Intelligent Vehicles Symposium, Eindhoven, The Netherlands, pp. 596-601, 2008, the method of estimating the ground plane incorporates topological constraints on the height of the cameras relative to the ground. In this case, only those points that correspond to a height in the range between two fixed boundaries are taken into consideration for the determination of the ground plane. Similarly, in the paper by F. Oniga and S. Nedevschi: "Processing Dense Stereo Data Using Elevation Maps: Road Surface, Traffic Isle, and Obstacle Detection", IEEE Tr. On Vehicular Technology, Vol. 59, No. 3, pp. 1172-1182, 2010, a method is presented in which the points are classified as belonging to the road or not, according to predetermined fixed margins. The introduction of topological constraints into these methods does indeed make it possible to improve the estimation of the ground plane and consequently the detection of obstacles during travel along the road. However, these topological constraints are based on fixed parameters, determined before the use of the estimation methods in accordance with the intended context of application. Consequently, these estimation methods cease to be reliable as soon as the environment deviates significantly from the nominal environment.

SUMMARY OF THE INVENTION

One object of the invention is, notably, to overcome some or all of the aforesaid drawbacks by adapting the topological and temporal constraints in accordance with an estimate of the quality of the image data and an estimate of the quality of the estimated ground plane for the previous image. For this purpose, the invention proposes a method of determining a triplet of parameters defining a ground plane in a three-dimensional reference frame on the basis of a depth image obtained from a sequence of images. The method comprises:
- a step of selecting valid points from the current depth image, the valid points being the points of the image whose distance from a point of origin of the three-dimensional frame of reference is in the range between a predetermined minimum distance and a predetermined maximum distance,
- a step of determining an indicator $R_{3d}$ for the current depth image, said indicator being dependent on the number of valid points in the current depth image, and on the total number of points in this image,
- a step of selecting a set of points of interest in the current depth image, each point of interest being selected if a distance between said point of interest and the ground plane determined for a previous image in the sequence is below a threshold $d_{sel}$,
- a step of determining a triplet of spatially filtered parameters on the basis of points of interest, and
- a step of determining a triplet of temporally filtered parameters as a function of the indicator $R_{3d}$ determined for the current depth image or for a previous image in the sequence.

The invention has the advantage, notably, that it enables the determination of a ground plane to be adapted to any type of environment, regardless of the quantity of textured areas in the image, the roughness and smoothness of the ground, and the variation of its inclination.

Advantageously, the method according to the invention also comprises a step of determining an indicator $R_{pl}$ for the current depth image, said indicator being dependent on the number of points in said image whose distance from the ground plane defined by the triplet of spatially filtered parameters is less than a predetermined distance $d_p$, and on the number of valid points in this image. Thus the step of determining the triplet of temporally filtered parameters may also depend on the indicator $R_{pl}$ determined for the current depth image or for a previous image in the sequence.

The step of determining the triplet of temporally filtered parameters includes, for example, a substep of determining an innovation parameter K, said parameter being:
- equal to zero if the indicator $R_{3d}$ determined for the current depth image or for a previous image in the sequence is below a predetermined threshold $S_{3d}$, or if the indicator $R_{pl}$ determined for the current depth image or for a previous image in the sequence is below a predetermined threshold $S_{pl}$,
- or equal to the value of the indicator $R_{pl}$ determined for the current depth image or for a previous image in the sequence, less the value of the predetermined threshold $S_p$, otherwise.

Each temporally filtered parameter $V_t$ may then be determined as a function of the innovation parameter K, of the temporally filtered parameter determined for the previous image in the sequence $V_{t-1}$, and of the spatially filtered parameter determined for the current depth image in the sequence $V_s$.

More precisely, each temporally filtered parameter $V_t$ can be determined by the relation $V_t = V_{t-1} \cdot (1-K) + V_s \cdot K$.

In a particular embodiment, the step of determining a triplet of spatially filtered parameters comprises:
- a substep of determining a plurality of triplets of spatially filtered parameters on the basis of the set of points of interest, and
- a substep of selecting, for each type of parameter, parameters whose value lies within a parameterable validity range, the validity range of each type of parameter being centered on the value of this parameter determined for a previous image in the sequence, and its width being determined as a function of the indicator $R_{pl}$ determined for a previous image in the sequence, and of the indicator $R_{3d}$ determined for the current image or for a previous image in the sequence.

The substep of determining a plurality of triplets of parameters comprises, for example, the following substeps:
- pseudorandom determination of a plurality of triplets of points in the set of points of interest, and
- determination, for each triplet of points, of a triplet of parameters defining a ground plane passing through the three points.

The step of determining a triplet of spatially filtered parameters may further comprise:
- a substep of determining, for each type of parameter, an average parameter whose value is equal to an average value of the selected parameters, said average parameters defining an average ground plane $P_m$,
- a substep of selecting a set of calculation points from among the points of interest, the calculation points being the points of interest whose distance from the average ground plane $P_m$ is less than a predetermined distance $d_g$, and
- a substep of determining the triplet of spatially filtered parameters on the basis of calculation points.

The triplet of spatially filtered parameters may, notably, be determined by the least squares method applied to the distances between the calculation points and the average ground plane $P_m$.

In a particular embodiment, the width of the validity range of each parameter is:
- increased if the indicator $R_{pl}$ determined for a previous image in the sequence is below a predetermined threshold $S_{pl2}$, and if the indicator $R_{3d}$ determined for the current image or for a previous image in the sequence is below a predetermined threshold $S_{3d2}$,
- reduced if the indicator $R_{pl}$ determined for a previous image in the sequence is above a predetermined threshold $S_{pl2}$, and
- unchanged otherwise.

The reduction and increase in the width of the validity range may be limited.

In a particular embodiment, the threshold $d_{sel}$ on the basis of which the set of points of interest is determined is dependent on the criterion $R_{pl}$ determined for a plurality of previous images in the sequence. The valid points of the current depth image are then selected as points of interest if the criterion $R_{pl}$ determined for a plurality of previous images in the sequence is below a predetermined threshold $S_{sel}$.

The method may include a supplementary step of determining an indicator $Q_p$, representing the quality of the ground plane determined for the current depth image, said indicator $Q_p$ being determined as a function of the indicators $R_{3d}$ and $R_{pl}$ determined for the current depth image.

In particular, the indicator $Q_p$ can be determined by the relation, $$Q_p = \frac{R_{pl}}{1 + \exp(g \cdot (S_{3d} - R_{3d}))},$$

where g is a real number in the range from 10 to 100, and $S_{3d}$ is a predetermined threshold.

The indicator $R_{pl}$ of a depth image is, for example, equal to the number of points in said image whose distance from the ground plane defined by the triplet of spatially filtered parameters is less than a predetermined distance $d_p$, divided by the number of valid points in this image. The indicator $R_{3d}$ of a depth image may, for its part, be equal to the number of valid points in this image divided by the total number of points in this image.

BRIEF DESCRIPTION OF THE DRAWINGS

The invention will be more fully understood and other advantages will become apparent from a reading of the following description, provided with reference to the attached drawings in which.

DETAILED DESCRIPTION

In the context of the invention, the aim is to determine the ground plane, for example a road, in a three-dimensional reference frame on the basis of a digital image. This digital image may be a disparity image, also called a disparity map, or a depth image. A disparity image is an image obtained by image processing from two stereoscopic images, that is to say images obtained from two video cameras observing the same scene. The video cameras are oriented in a substantially identical manner, but they are positioned at a distance from one another. Thus the optical axes of the two cameras are substantially parallel. If this is not the case, a correction is performed to make the optical axes parallel. The image processing consists in determining the corresponding pairs of points in the two images. The disparity of a point is then defined as the difference in position between the point in the image from the first camera, considered as the reference image, and the same point in the image from the second camera. On the basis of the disparity information d, and given the distance B between the two cameras and their focal length f, the depth p of the point in question can be determined by the formula p=B·f/d. The image containing this depth information is called the depth image. In the rest of the description, it is assumed that the depth image on the basis of which the ground plane is determined has been obtained from stereoscopic images. However, the depth image could also be obtained by combining a video camera with a distance sensor capable of supplying depth information for at least some of the points in the image.

In the rest of the description, it is also assumed that the determination of a plane is equivalent to the determination of a triplet of parameters. This is because any plane can be defined in a three-dimensional reference frame by three parameters which are independent of one another. In a Cartesian reference frame, for example, a plane may be modeled by the equation A·x+B·y+C·z+D=0; that is to say, after normalization, A'·x+B'·y+C'·z+1=0. The parameters are then A', B' and C'. In a spherical reference frame, a plane may also be represented by three independent parameters, for example a distance and two angles. It is also assumed that the plane is determined in a reference frame related to the camera supplying the reference image, the origin of this reference frame being the optical center of this camera, and that the parameters defining the ground plane are the height h of one of the cameras relative to the ground, the angle θ formed between the optical axis of this camera and the ground plane, and the angle φ formed between the ground plane and the axis passing through the optical centers of the two cameras.

Figure 1:
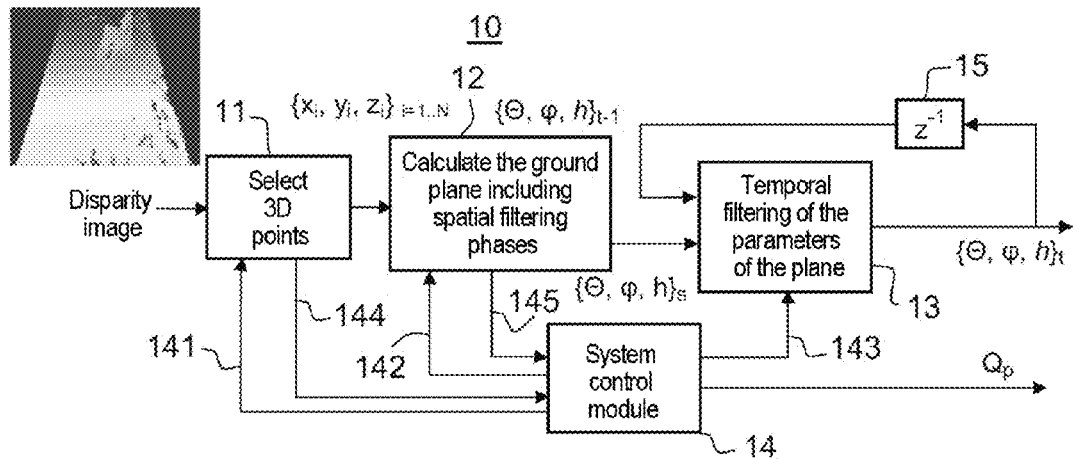
FIG. 1 shows schematically an example of a system for applying the method of determining a ground plane according to the invention.

FIG. 1 shows schematically an example of a system for applying the method of determining a ground plane on the basis of a depth image taken from a sequence of images. The method could also be applied to a disparity image, such as that shown in FIG. 1, since the relation between the disparity image information and the depth information is bijective. In particular, this relation is linear, which means, notably, that a plane in the disparity image is also a plane in the depth image. The system 10 comprises a module 11 for selecting three-dimensional points (3D), a module 12 for calculating the ground plane, a temporal filtering module 13, and a system control module 14. The module 11 receives the depth images and selects within each image a set of N points of interest, denoted $\{x_i, y_i, z_i\}_{i \in \{1, N\}}$, which it transfers to module 12. The module 12 determines a ground plane for each depth image on the basis of the points of interest. In particular, the module 12 determines a triplet of parameters defining a ground plane for each image. The determination of a triplet of parameters includes steps of spatial filtering, as explained in detail below. The triplet of parameters obtained from the module 12 is therefore called the triplet of spatially filtered parameters, and is denoted $\{\theta, \phi, h\}_s$. The triplet of parameters $\{\theta, \phi, h\}_s$ is transferred to the module 13, which determines a new triplet of parameters defining a ground plane. This determination of the new triplet of parameters includes a step of temporal filtering. The triplet of parameters obtained from the module 13 is therefore called the triplet of spatially filtered parameters, and is denoted $\{\theta, \phi, h\}_t$. More specifically, the module 13 determines the new triplet of parameters $\{\theta, \phi, h\}_t$ on the basis of the triplet of parameters $\{\theta, \phi, h\}_s$ determined for the current image in the sequence, and on the basis of the triplet of parameters $\{\theta, \phi, h\}_{t-1}$ determined by the module 13 for the previous image in the sequence. A delay module 15 represents the reinjection of the triplet of parameters $\{\theta, \phi, h\}_t$ for the next image in the sequence. For a current depth image, the triplet of parameters $\{\theta, \phi, h\}_t$ corresponds to the finally estimated triplet of parameters.

The method of determining a ground plane proposed by the invention requires, on the one hand, spatial filtering of the points in the image used for determining the parameters of the ground plane and/or spatial filtering of these parameters, and, on the other hand, temporal filtering of the parameters of the ground plane. It is essentially characterized in that the temporal filtering of the parameters is dependent on an indicator $R_{3d}$ representing the quality of the data available for the determination of the ground plane. Advantageously, the temporal filtering of the parameters is also dependent on an indicator $R_{pl}$ representing the quality of the ground plane determined after spatial filtering. Similarly, the spatial filtering can also be parameterized as a function of the indicators $R_{3d}$ and $R_{pl}$. Thus the spatial filtering and the temporal filtering can be adapted as a function of the quality of the data available and the quality of the ground planes determined previously for the different images in the sequence. More generally, the invention makes use of the idea according to which the more the estimated plane for a depth image makes it possible to "explain" the points in this image, the more accurately the planes of the subsequent images can be determined. In particular, for the spatial filtering, this means that the ground plane is searched for in a more limited space, and that, for the temporal filtering, the previously estimated ground planes are taken into consideration to a lesser degree.

Figure 2:
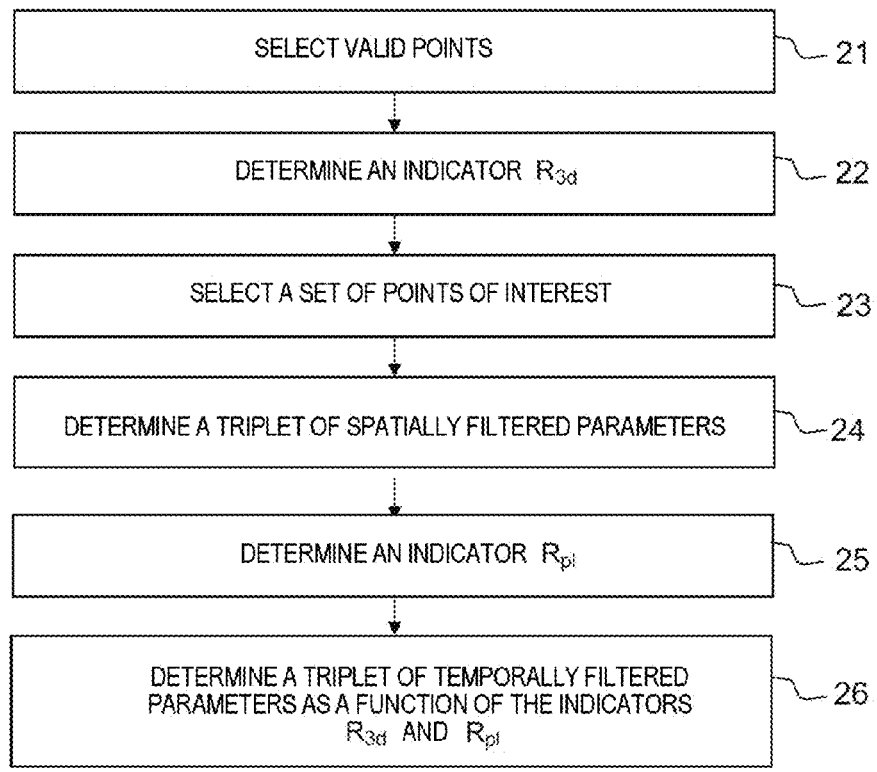
FIG. 2 shows an example of steps executed in the method of determining a ground plane according to the invention.

FIG. 2 shows an example of steps executed in the method of determining a ground plane according to the invention. In a first step 21, the points in the current depth image whose distance from the origin of the three-dimensional frame of reference is in the range between a minimum distance $D_{min}$ and a predetermined maximum distance $D_{max}$ are selected. These points are called valid points. The origin of the reference frame corresponds, for example, to the center of the image plane of the depth image, or the optical center of one of the cameras. For the areas of the image with very little texturing, the depth information cannot be determined. Conventionally, the depth of these points is generally set to an infinite value, or to the maximum value that can be quantified. Therefore these points are not considered to be valid. On the other hand, it is assumed that the most distant points have insufficient distance information to be taken into consideration in the determination of the ground plane. Finally, the points in the image whose distance is relatively small generally correspond to obstacles, for example pedestrians. The nearest and most distant points are therefore not taken into consideration for the determination of the ground plane. By way of example, the minimum and maximum distances have values of 1 meter (m) and 5 m, respectively. In a second step 22, the indicator $R_{3d}$ is determined for the current depth image. This indicator is determined as a function of the number of valid points in the current depth image, and of the total number of points in this image. It is, for example, equal to the ratio of the number of valid points in the current depth image to the total number of points in this image. Thus the indicator $R_{3d}$ can be used to estimate the quality of the 3D data, or, more precisely, the proportion of points in the image that are potentially useful for the determination of the ground plane. In a third step 23, a set of points of interest is selected from among the valid points in the current depth image. A point of interest is selected if a distance between this point and the ground plane determined for the previous image in the sequence is below a threshold distance $d_{sel}$. The distance between a point and a plane is considered to be the height of the point relative to the plane. The ground plane in question may also be determined on the basis of the planes determined for a plurality of previous images in the sequence. It is, for example, an average of the ground planes determined for the preceding images in the sequence. The value of the threshold distance is, for example, equal to 0.3 m. Step 23 makes it possible to eliminate the points in the image that are known in advance not to belong to the ground plane, such as points representing traffic signs or pedestrians. In a fourth step 24, the triplet of spatially filtered parameters $\{\theta,\phi,h\}_s$ is determined on the basis of the set of points of interest. This triplet of parameters defines a spatially filtered ground plane $P_s$. An example of embodiment of step 24 is detailed below. In a step 25, the indicator $R_{pl}$ is determined for the current depth image. This indicator $R_{pl}$ is dependent on the number of points in the image whose distance from the ground plane $P_s$ is less than a predetermined distance $d_p$, and of the number of valid points in this image. It is, for example, equal to the ratio of the number of points in the image whose distance from the ground plane $P_s$ is less than the predetermined distance $d_p$ to the number of valid points in this image. The value of the distance $d_p$ is, for example, equal to 0.1 m. Thus the indicator $R_{pl}$ can be used to estimate the quality of the determined ground plane $P_s$, or, more precisely, the proportion between the number of points in the image that are near the plane $P_s$ and the number of points in the image that are potentially useful for its determination. In a step 26, the triplet of temporally filtered parameters $\{\theta,\phi,h\}_t$ is determined for the current depth image on the basis of the triplet of parameters $\{\theta,\phi,h\}_s$ determined for this image, on the basis of the triplet of temporally filtered parameters $\{\theta,\phi,h\}_{t-1}$ determined for a previous image in the sequence, and on the basis of the indicator $R_{3d}$ determined for the current image or for a previous image in the sequence. The triplet of parameters $\{\theta,\phi,h\}_{t-1}$ is, for example, the one determined for the preceding image in the sequence. The triplet of temporally filtered parameters $\{\theta,\phi,h\}_t$ defines a temporally filtered ground plane $P_t$. In a particularly advantageous embodiment, the ground plane $P_t$ is also determined as a function of the indicator $R_{pl}$ determined for the current depth image or for a previous image in the sequence.

In a particular embodiment, the threshold distance $d_{sel}$ is dependent on the criterion $R_{pl}$ determined for a plurality of previous images in the sequence. In particular, if the criterion $R_{pl}$ determined for each of the preceding images in the sequence is below a predetermined threshold $S_{sel}$, then the set of the valid points in the current depth image may be selected as points of interest. In other words, the filtering of the valid points is disabled. The number of images for which the filtering of the valid points is disabled corresponds, for example, to a duration of about 1 or 2 seconds. The filtering of the valid points may be re-activated as soon as the criterion $R_{pl}$ exceeds the threshold $S_{sel}$.

Figure 3:
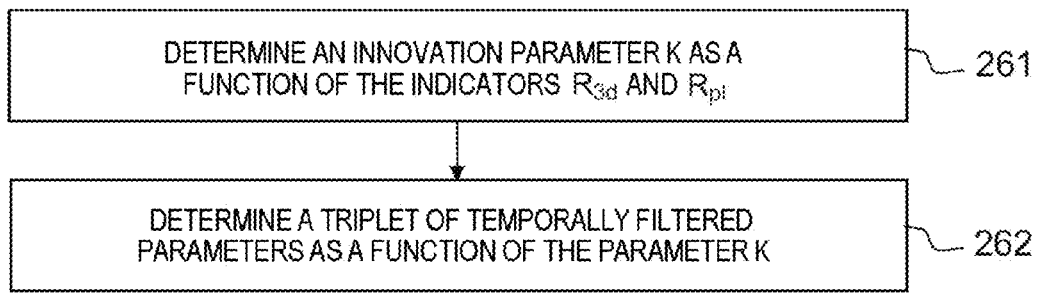
FIG. 3 shows a specific example of embodiment of the step of determining a triplet of temporally filtered parameters.

FIG. 3 shows a specific example of embodiment of step 26 for determining the triplet $\{\theta,\phi,h\}_t$. In this example, it is assumed that each parameter $\theta,\phi,h$ is filtered individually. $V_t$ denotes one of the parameters of the triplet $\{\theta,\phi,h\}_t$, $V_{t-1}$ denotes the parameter of the same type in the triplet $\{\theta,\phi,h\}_{t-1}$ determined for the preceding image in the sequence, and $V_s$ denotes the parameter of the same type in the triplet $\{\theta,\phi,h\}_s$. A predetermined threshold $S_{3d}$ and a predetermined threshold $S_{pl}$ are considered. In a first substep 261, an innovation parameter K is determined. If the indicator $R_{3d}$ determined for the current depth image is below the threshold $S_{3d}$, then the value of the innovation parameter K is set to zero. Conversely, if the indicator $R_{3d}$ is above the threshold $S_{3d}$, then the value of the innovation parameter is determined as a function of the indicator $R_{pl}$. If the indicator $R_{pl}$ is below the threshold $S_{pl}$, then the value of the innovation parameter K is set to zero. If the indicator $R_{pl}$ is below the threshold $S_{pl}$, then the value of the innovation parameter is set to be equal to the value of the indicator $R_{pl}$, minus the value of the threshold $S_p$, (K=$R_{pl}$−$S_{pl}$). In a second substep 262, each parameter $V_t$ is determined as a function of the corresponding parameter $V_{t-1}$, the corresponding parameter $V_s$, and the innovation parameter K. The relation for determining the parameters $V_t$ may take various forms. It may, notably, be linear or nonlinear, and may be continuous or noncontinuous. By way of example, the following relation may be used:

$$V_t = V_{t-1} \cdot (1-K) + V_s \cdot K.$$

Thus the value of each parameter is updated for an image in the sequence only if this image has enough valid points, and if a significant number of valid points are located near the plane $P_s$ determined for this image. For example, the threshold $S_{3d}$ may take the value of 0.2 and the threshold $S_{pl}$ may take the value of 0.1.

In a particular embodiment, if the indicator $R_{3d}$ remains below the threshold $S_{3d}$ for a predetermined number of previous images in the sequence, then the triplet of temporally filtered parameters $\{\theta,\phi,h\}_t$ is reinitialized with the initial parameters $\theta_0$, $\phi_0$ and $h_0$. These initial parameters $\theta_0$, $\phi_0$ and $h_0$ are determined before the use of the method of determining the ground plane.

Figure 4:
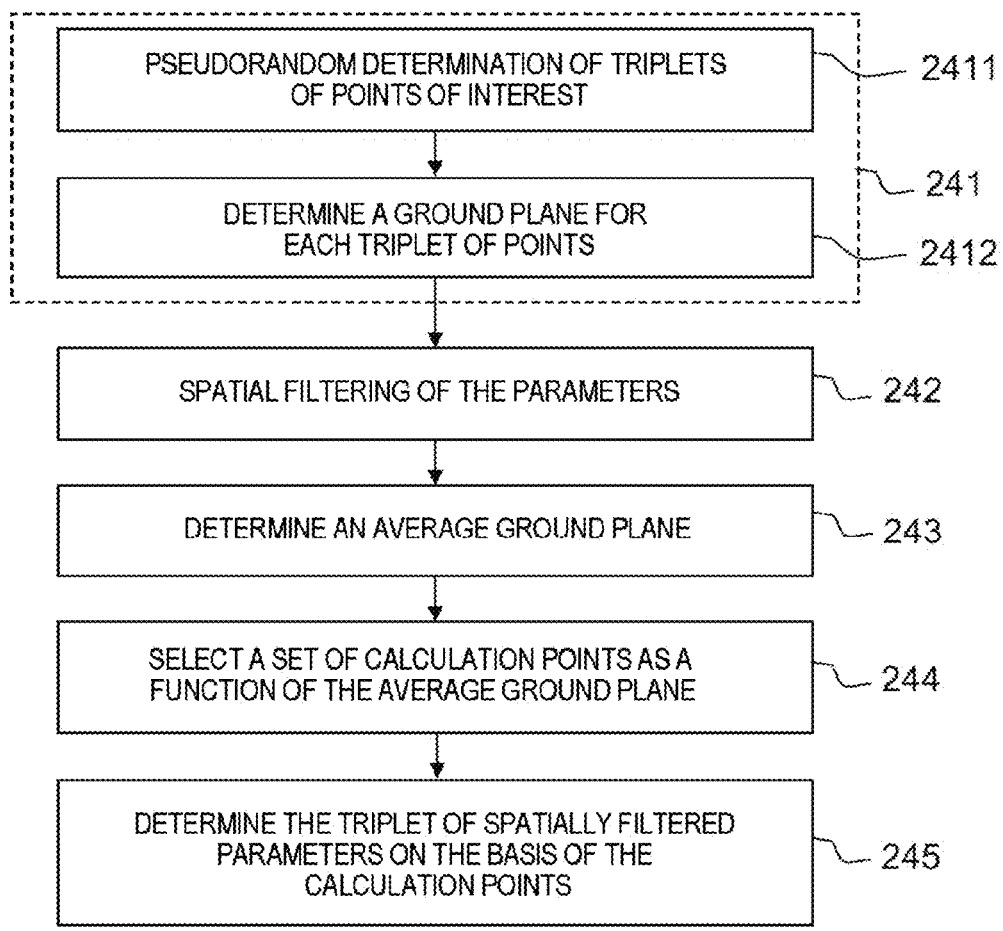
FIG. 4 shows an example of embodiment of the step of determining a triplet of spatially filtered parameters.

Step 24 of determining the triplet of spatially filtered parameters $\{\theta,\phi,h\}_s$ may also be dependent on the indicator $R_{3d}$ determined for the current depth image or for a previous image in the sequence, and/or of the indicator $R_{pl}$ determined for a previous image in the sequence. FIG. 4 shows such an example of embodiment of step 24 of determining the triplet of spatially filtered parameters $\{\theta,\phi,h\}_s$. In a first substep 241, a plurality of spatially filtered parameters are determined on the basis of the set of points of interest. More precisely, the substep 241 comprises, for example, the following steps. In a step 2411, M triplets of points in the set of points of interest are determined in a pseudorandom way. In a second step 2412, for each triplet of points, a triplet of parameters $\{\theta,\phi,h\}_j$ is determined, defining a ground plane $P_j$ passing through the three points, where j is an integer in the range from 1 to M. In a second substep 242, said triplets of parameters are spatially filtered as a function of the indicators $R_{pl}$ and $R_{3d}$. In other words, the parameters are or are not selected as a function of their value and of the indicators $R_{pl}$ and $R_{3d}$. Substep 242 uses, for example, parameterable validity ranges, one validity range being associated with each type of parameter. The validity range of a type of parameter is centered on the value of the parameter in question determined for a previous image in the sequence, for example the preceding image in the sequence. For the first image in the sequence, the initial parameters $\theta_0$, $\phi_0$ and $h_0$ may be considered. The width of the range is determined as a function of the indicator $R_{pl}$ determined for a previous image in the sequence, and of the indicator $R_{3d}$ determined for the current image or for a previous image in the sequence. By way of example, the initial range widths $\Delta\theta_0$, $\Delta\phi_0$ and $\Delta h_0$ will be considered. These range widths are associated with the first image in the sequence. For each new image, the width of the ranges may be increased or reduced as a function of the indicators $R_{3d}$ and $R_{pl}$. For example, the range widths are increased by 20% if the indicator $R_{pl}$ is below a threshold $S_{pl2}$, and if the indicator $R_{3d}$ is above a threshold $S_{3d2}$. They are reduced by 20% if the indicator $R_{pl}$ is above the threshold $S_{pl2}$, and unchanged otherwise. Furthermore, the variation of the range widths may be limited. The increase is, for example, limited to 150% of the initial range widths $\Delta\theta_0$, $\Delta\phi_0$ and $\Delta h_0$, and the reduction is limited to 70% of these range widths. The parameters whose value lies within the corresponding validity range are called selected parameters. In a third substep 243, an average parameter $\theta_m$, $\phi_m$ and $h_m$ is determined for each type of parameter. These average parameters define an average ground plane $P_m$. The value of each average parameter $\theta_m$, $\phi_m$ and $h_m$ is an average of the values of the selected parameters. It is, for example, an arithmetic or quadratic average. In a particular embodiment, a histogram is plotted for each type of parameter. A histogram has classes whose width corresponds to a range of values for the parameter concerned. Each parameter of the triplet $\{\theta,\phi,h\}_j$ is classified in one of the classes of the histogram. Step 242 of spatial filtering then consists in applying the validity ranges on the histograms, each validity range defining a lower and an upper boundary, and retaining only those triplets of parameters $\{\theta,\phi,h\}_j$ for which all three parameters lie within in the validity ranges. The substep 243 consists in taking from each histogram an average value of the class containing the most occurrences. In a fourth substep 244, a set of calculation points is selected from among the points of interest. The determination of the calculation points consists in selecting the points of interest whose distance from the average ground plane $P_m$ is less than a predetermined distance $d_g$. This distance is, for example, the same as the distance $d_p$. In a fifth substep 245, the triplet of spatially filtered parameters $\{\theta,\phi,h\}_s$ is determined on the basis of the calculation points. In a particular embodiment, the triplet $\{\theta,\phi,h\}_s$ is determined by the least squares method applied to the distances between the calculation points and the average ground plane $P_m$.

The system shown in the figure enables the method according to the invention to be used. In particular, step 21 of selecting valid points, step 22 of determining the indicator $R_{3d}$, and step 23 of selecting valid points may be executed by the module 11; step 24 of determining the triplet of spatially filtered parameters $\{\theta,\phi,h\}_s$ and step 25 of determining the indicator $R_{pl}$ may be executed by the module 12; and step 26 of determining the triplet of temporally filtered parameters $\{\theta,\phi,h\}_t$ may be executed by the module 13. Steps 23, 24 and 26 may be dependent on the indicators $R_{3d}$ and $R_{pl}$. This dependence is shown in FIG. 1 by arrows 141, 142 and 143 pointing from the control module 14 to modules 11, 12 and 13 respectively. Additionally, the determination of the indicator $R_{3d}$ depends on step 21, and the determination of the indicator $R_{pl}$ depends on steps 21 and 24. These dependences are shown by arrows 144 and 145 pointing from the modules 11 and 12, respectively, toward the control module 14.

The system enabling the method according to the invention to be used may be implemented on the basis of hardware and/or software elements. The method according to the invention may, in particular, be used as a computer program including instructions for its execution. The computer program may be recorded on a processor-readable recording medium.

The method of determining a ground plane is also intended to supply an indicator $Q_p$ representing the quality of the ground plane determined for the current depth image. This indicator $Q_p$ is determined as a function of the indicators $R_{3d}$ and $R_{pl}$ determined for the current depth image. It is, for example, defined by the following relation:

$$Q_p = R_{pl} \cdot sig(R_{3d}),$$

where sig(x) is a modified sigmoid function defined as follows:

$$sig(x) = \frac{1}{1 + \exp(g \cdot (S_{3d} - x))},$$

where g is a real number in the range from 10 to 100. This parameter g can be used to control the sensitivity of the indicator $Q_p$ as a function of the number of valid points. The indicator $Q_p$ may be used in image processing downstream of the determination of the ground plane. By way of example, if the determination of the ground plane is followed by processing for searching for obstacles placed on the ground, this processing may be adapted as a function of the indicator $Q_p$. If its value is relatively small, the obstacles can be searched for with a greater margin on either side of the ground plane. Conversely, if the value of the indicator $Q_p$ is relatively high, the margin may be reduced, thus improving the duration of the obstacle searching processing.

The invention claimed is:

1. A method for determining a triplet of parameters defining a ground plane in a three-dimensional reference frame on a basis of a depth image obtained from a sequence of images, the method comprising:
   selecting valid points from a current depth image, the valid points being points of the current depth image whose distance from a point of origin of the three-dimensional frame of reference is in a range between a predetermined minimum distance and a predetermined maximum distance,
   determining a first indicator $R_{3d}$ for the current depth image, said first indicator being dependent on a number of valid points in the current depth image, and on a total number of points in the current depth image,
   selecting a set of points of interest in the current depth image, each point of interest being selected if a distance between said point of interest and the ground plane determined for a previous image in the sequence of images is below a first threshold $d_{sel}$,
   determining a triplet of spatially filtered parameters on a basis of the points of interest, and
   determining a triplet of temporally filtered parameters as a function of the first indicator $R_{3d}$ determined for the current depth image, for the previous image, or for another a previous image in the sequence of images.

2. The method of claim 1, further comprising determining a second indicator $R_{pl}$ for the current depth image, said second indicator being dependent on the number of points in said image whose distance from the ground plane defined by the triplet of spatially filtered parameters is less than a first predetermined distance $d_p$, and on the number of valid points in this image, the determining of the triplet of temporally filtered parameters also being dependent on the second indicator $R_{pl}$ determined for the current depth image or for a previous image in the sequence of images.

3. The method of claim 2, wherein the determining of the triplet of temporally filtered parameters includes determining an innovation parameter K, said parameter being:
   equal to zero if the first indicator $R_{3d}$ determined for the current depth image or for a previous image in the sequence of images is below a second predetermined threshold $S_{3d}$, or if the second indicator $R_{pl}$ determined for the current depth image or for a previous image in the sequence of images is below a third predetermined threshold $S_{pl}$,
   equal to the value of the second indicator $R_{pl}$ determined for the current depth image or for a previous image in the sequence of images, less the value of the third predetermined threshold $S_{p1}$ otherwise,
   each parameter $V_t$ of the triplet of temporally filtered parameters being determined as a function of the innovation parameter K, of a temporally filtered parameter determined for a previous image in the sequence of images and of a spatially filtered parameter determined for the current depth image in the sequence of images.

4. The method of claim 3, wherein each temporally filtered parameter $V_t$ is determined by the relation:

$$V_t = V_{t-1} \cdot (1-K) + V_g \cdot K.$$

5. The method of claim 2, wherein the determining of a triplet of spatially filtered parameters comprises:
   determining a plurality of triplets of parameters on the basis of a set of points of interest, and
   for each type of parameter, selecting parameters whose value lies within a parameterable validity range, the validity range of each type of parameter being centered on a value of said parameter determined for a previous image in the sequence of images, and its width being determined as a function of the second indicator $R_{pl}$ determined for a previous image in the sequence of images, and of the first indicator $R_{3d}$ determined for the current image or for a previous image in the sequence of images.

6. The method of claim 5, wherein the determining of a plurality of triplets of parameters comprises:
   pseudorandom determination of a plurality of triplets of points in a set of points of interest, and
   determination, for each triplet of points, of a triplet of parameters defining a ground plane passing through every point in said triplet of points.

7. The method of claim 5, wherein the determining of a triplet of spatially filtered parameters further comprises:
   determining, for each type of parameter, an average parameter whose value is equal to an average value of the selected parameters, said average parameters defining an average ground plane $P_m$,
   selecting a set of calculation points from among the points of interest, the calculation points being the points of interest whose distance from the average ground plane $P_m$ is less than a second predetermined distance $d_g$, and
   determining the triplet of spatially filtered parameters on the basis of the calculation points.

8. The method of claim 7, wherein the triplet of spatially filtered parameters is determined by a least squares method applied to the distances between the calculation points and the mean ground plane $P_m$.

9. The method of claim 5, wherein the width of the validity range of each parameter is:
   increased if the second indicator $R_{pl}$ determined for a previous image in the sequence of images is below a fourth predetermined threshold $S_{pl2}$, and if the first indicator $R_{3d}$ determined for the current image or for a previous image in the sequence of images is below a fifth predetermined threshold $S_{3d2}$,
   reduced if the second indicator $R_{pl}$ determined for a previous image in the sequence of images is above the fourth predetermined threshold $S_{pl2}$, and
   unchanged otherwise.

10. The method of claim 9, wherein the reduction and increase of the width of the validity range are limited.

11. The method of claim 2, wherein the first threshold $d_{sel}$ is dependent on the second indicator $R_{pl}$ determined for a plurality of previous images in the sequence of images, the set of valid points of the current depth image being selected as points of interest if the second indicator $R_{pl}$ determined for a plurality of previous images in the sequence of images is below a sixth predetermined threshold $S_{sel}$.

12. The method of claim 2, comprising a supplementary step of determining a third indicator $Q_p$, representing the quality of the ground plane determined for the current depth image, said third indicator $Q_p$ being determined as a function of the first indicator $R_{3d}$ and the second indicator $R_{pl}$ determined for the current depth image.

13. The method of claim 12, wherein the third indicator $Q_p$ is determined by the relation:

$$Q_p = \frac{R_{pl}}{1 + \exp(g \cdot (S_{3d} - R_{3d}))},$$

where g is a real number in the range from 10 to 100, and $S_{3d}$ is a predetermined threshold.

14. The method of claim 2, wherein the second indicator $R_{pl}$ of a depth image is equal to the number of points in said image whose distance from the ground plane defined by the triplet of spatially filtered parameters is less than the first predetermined distance $d_p$, divided by the number of valid points in said image.

15. The method of claim 1, wherein the first indicator $R_{3d}$ of a depth image is equal to the number of valid points in said image divided by the total number of points in said image.

16. A system for determining a ground plane in a sequence of images, comprising at least a module configured to execute:
a method for determining a triplet of parameters defining a ground plane in a three-dimensional reference frame on the basis of a depth image obtained from a sequence of images, the method comprising:
select valid points from a current depth image, the valid points being points of the current depth image whose distance from a pint of origin of the three-dimensional frame of reference is in a range between a predetermined minimum distance and a predetermined maximum distance,
determining a first indicator $R_{3d}$ for the current depth images, said first indicator being dependent on a number of valid points in the current depth image, and on a total number of points in the current depth image,
selecting a set of points of interest in the current depth image, each point of interest being selected if a distance between said point of interest and the ground plane determined for a previous image in the sequence of images is below a first threshold $d_{sel}$,
determining a triplet of spatially filtered parameters on a basis of the points of interest, and
determining a triplet of temporally filtered parameters as a function of the first indicator $R_{3d}$ determined for he current depth images, for the previous image or for another previous image in the sequence of images.

17. A computer program comprising instructions stored on a tangible non-transitory computer-readable storage medium for executing on a processor a method for determining a triplet of parameters defining a ground plane in a three-dimensional reference frame on the basis of depth image obtained from a sequence of images, the method comprising:
selecting valid points from a current depth image, the valid points being points of the current depth image whose distance from a point of origin of the three-dimensional frame of reference is in a range between a predetermined minimum distance and a predetermined maximum distance,
determining a first indicator $R_{3d}$ for the current depth images, said first indicator being dependent on a number of valid points in the current depth image, and on a total number of points in the current depth image,
selecting a set of points of interest in the current depth image, each point of interest being selected if a distance between said point of interest and the ground plane determined for a previous image in the sequence of images is below a first threshold $d_{sel}$,
determining a triplet of spatially filtered parameters on a basis of the points of interest, and
determining a triplet of temporally filtered parameters as a function of the first indicator $R_{3d}$ determined for the current depth images, for the previous image or for another previous image in the sequence of images.

18. A tangible non-transitory computer readable medium on which is recorded a program including instructions for executing a method for determining a triplet of parameters defining a ground plane in a three-dimensional reference frame on the basis of a depth image obtained from a sequence of images, the method comprising:
selecting valid points from a current depth image, the valid points being points of the current depth image whose distance from a point of origin of the three-dimensional frame of reference is in a range between a predetermined minimum distance and a predetermined maximum distance,
determining a first indicator $R_{3d}$ for the current depth image, said first indicator being dependent on a number of valid points in the current depth image, and on a total number of points in the current depth image,
selecting a set of points of interest in the current depth image, each point of interest being selected if a distance between said point of interest and the ground plane determined for a previous image in the sequence of images is below a first threshold $d_{sel}$,
determining a triplet of spatially filtered parameters on a basis of the points of interest, and
determining a triplet of temporally filtered parameters as a function of the first indicator $R_{3d}$ determined for he current depth image, for the previous image or for another previous image in the sequence of images.

* * * * *